May 24, 1938.                H. A. GREEN                2,118,379
                            DAVENPORT CLAMP
                Original Filed March 13, 1935    3 Sheets-Sheet 3
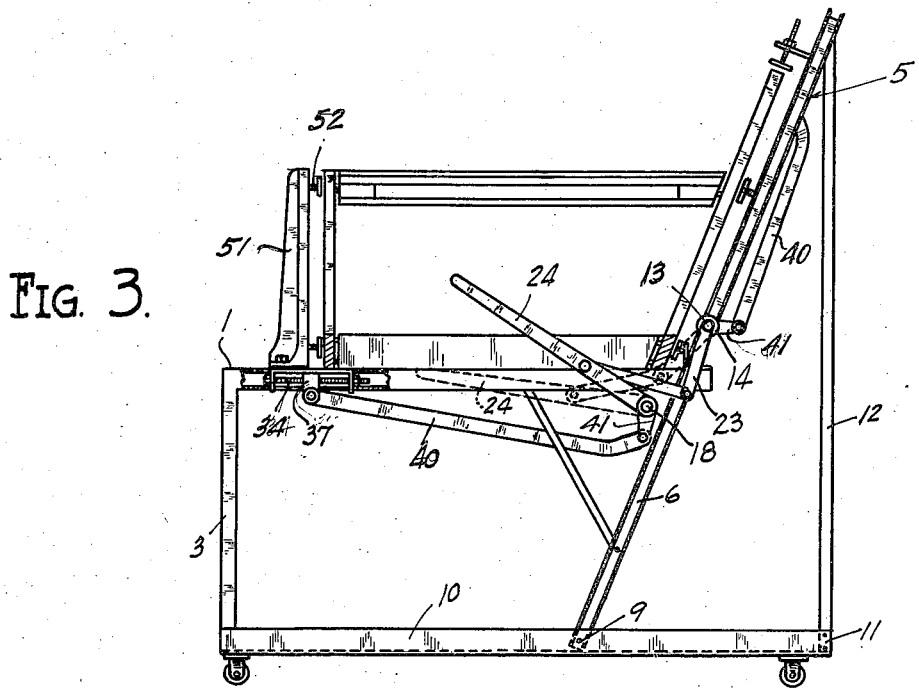
FIG. 3.
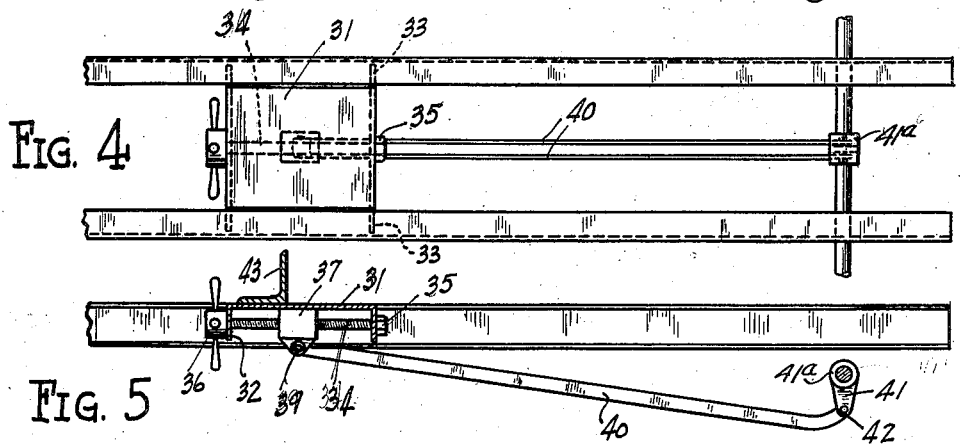
FIG. 4.
FIG. 5.
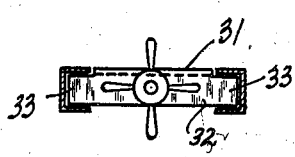
FIG. 6.
HARRY A. GREEN
INVENTOR.
BY *James D. Ginnau*
ATTORNEYS.

Patented May 24, 1938

2,118,379

UNITED STATES PATENT OFFICE 2,118,379

DAVENPORT CLAMP

Harry A. Green, Portland, Oreg.

Application March 13, 1935, Serial No. 10,848
Renewed November 3, 1937

9 Claims. (Cl. 144—291)

This invention relates to improvements in machines for assembling furniture and is particularly adapted for uniting and securely clamping together the various structural elements of davenports.

Heretofore, in the construction of furniture of this character it was necessary to assemble the structural elements thereof into individual units and then assemble these various units into a completed piece of furniture. This sort of progressive assembly work required the use of numerous hand-clamps not only in the assembling of each individual element or unit but also in the assembling of the individual units into an entire unit. The inaccuracies and inefficiencies of such methods of clamping furniture together in the assembly operation are obvious and particularly since it is impossible by such hand-clamping methods to apply clamping force equally and simultaneously on all of the parts of the frame in order that all the doweled portions will be forced together to the fullest extent and the alignment and desired form of frame work maintained. Moreover, such hand-clamping by means of various auxiliary clamping devices also increases the time of manufacture, and thereby increases the cost of production.

Accordingly, therefore, the principal object of my invention is to provide a machine adapted to receive a completely assembled davenport with the various parts thereof loosely joined together, and adapted thereafter, by a single operation on the part of the operator to exert clamping force equally and simultaneously to all the parts to securely unite them to their limits of abutment into finally assembled form.

Another object of the invention is the provision of means for automatically locking the machine in its operative clamping position to securely hold the various elements in their united positions to receive reinforcing members such as blocks, braces, and the like. Also, during the application of these various reinforcing elements the previously united structural elements of the davenport are permitted to dry to thereby insure a more permanent union between all of the elements.

A still further object of the invention is the provision of a machine of this character wherein the clamping members and abutments are all individually adjustable and thus adapted to operate upon davenport frames of various sizes and which may vary from the rectangular and which are provided with rearwardly inclined or curved back sections and outwardly diverging arm rest sections.

I attain the foregoing objects by providing a machine comprising two frame sections, one of said sections lying in a horizontal plane, the other in a substantially upright plane, and both of said sections united with each other along their adjacent edges. I also provide a plurality of adjustably mounted work abutments, and a plurality of individually adjustable clamping elements which are adapted to be moved simultaneously toward the work being dealt with. Said abutments and clamping elements being provided on both the upright and horizontal frame members.

These and other objects will appear as my invention is more fully hereinafter described in the following specification, illustrated in the accompanying drawings and finally pointed out in the appended claims.

In the drawings:

Figure 3 is an end elevation of Figure 1, looking in the direction of the arrow in Figure 1.

Figure 4 is a detailed top plan view of one of the adjustable and movable clamping members.

Figure 5 is a longitudinal sectional view through Figure 4.

Figure 6 is an end elevation of Figure 5 as viewed from the left hand side.

Referring now more particularly to the drawings, my invention consists of a horizontal frame member generally indicated at 1, which is supported at its front side by suitable legs 2 and 3 provided with casters 4. This frame will be hereinafter referred to as the horizontal frame.

Figure 1:
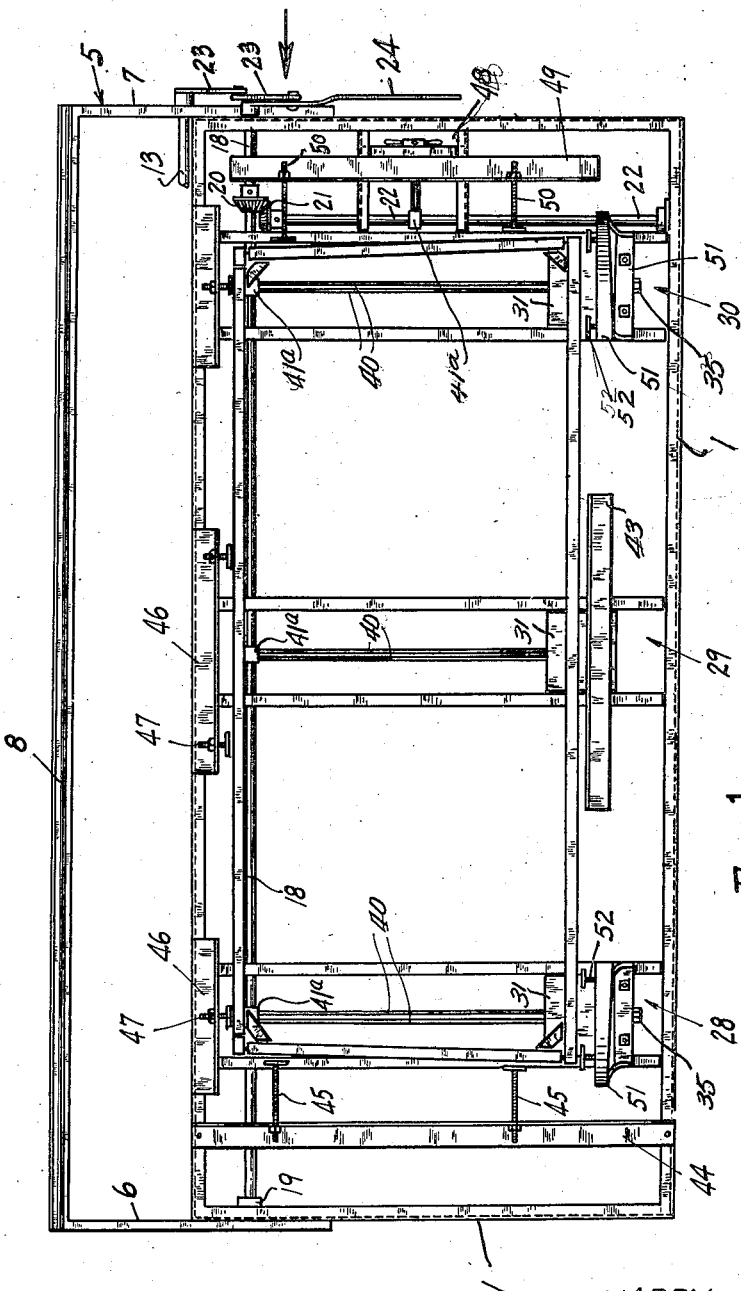
Figure 1 is a top plan view of my new and improved machine, with parts removed for convenience of illustration, and showing a portion of a davenport frame in operative engagement with the machine.
Figure 2:
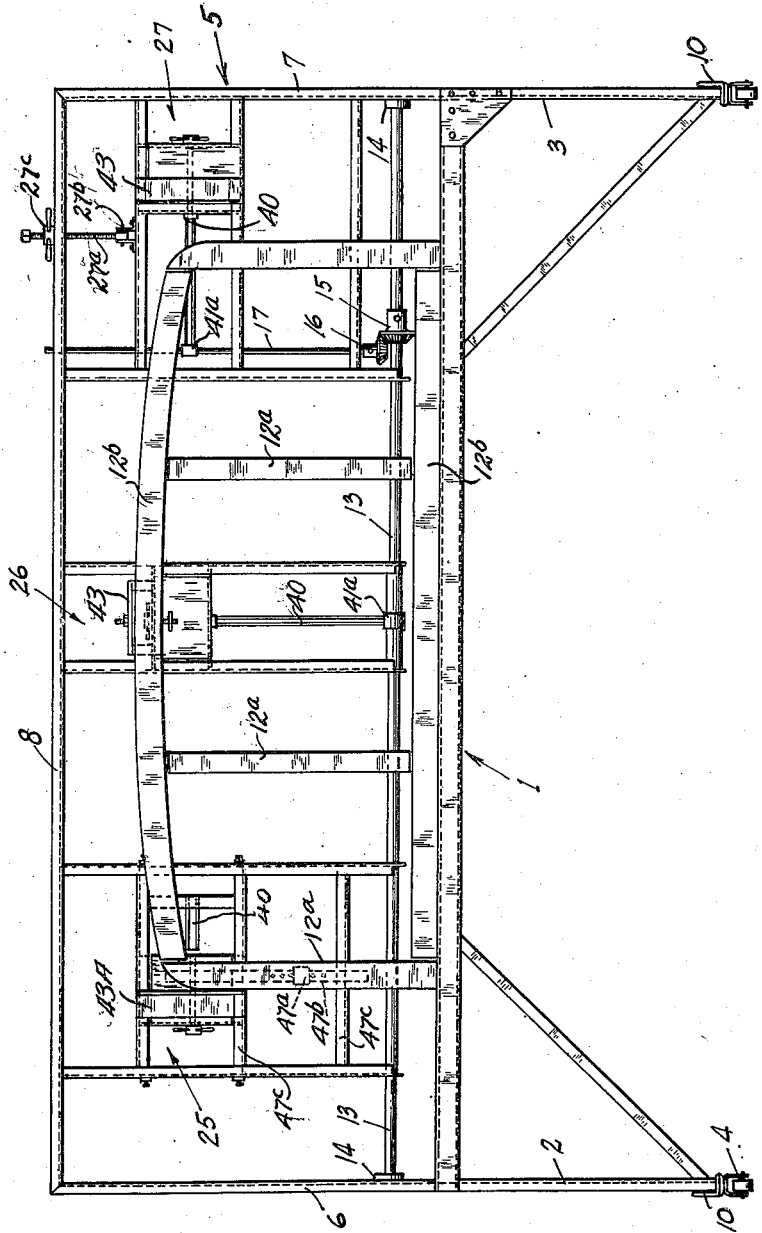
Figure 2 is a front elevation of the machine showing the frame work of the back rest of the davenport in operative engagement with the upright frame members of the machine.

Supporting the rear edge of the horizontal frame is an upright frame generally indicated at 5 which consists of vertical members 6 and 7, and a transverse member 8. The rear corners of the horizontal frame are secured to the vertical members 6 and 7 of the upright frame by any suitable means, such, for instance, as bolts, rivets or the like. The lowermost ends of the end members 6 and 7 are secured as at 9 to a transverse member 10 which extends from the legs 3 and 4 rearwardly beyond the point of attachment of the end members 6 and 7 and terminates as at 11 in connection with upright braces 12, which at their uppermost ends are secured to the transverse member 8 of the upright frame for stabilizing the same. Thus it will be seen that I provide a substantial and rigid structure consisting of a horizontal frame and an upright frame. The upright frame may be slightly inclined rearwardly to receive, in proper working relation, the correspondingly inclined back rest of a davenport, as shown in Figures 2 and 3 and which consists of upright members 12a and transverse members 12b which are doweled and glued together in the conventional manner.

Extending full length of the upright frame is a shaft 13 which is rotatably mounted at its ends in suitable bearings 14 which are mounted to the end members 6 and 7. On this shaft I mount a beveled gear 15 in operative engagement with a companion gear 16 which is secured to one end of a shaft 17 which is rotatably mounted within the upright frame and disposed at right angles to the shaft 13. A similar shaft 18 extends full length of the horizontal frame and is journaled in the ends thereof by suitable bearings 19. This shaft is also provided with a beveled gear 20 cooperatively engaging with a companion gear 21 which is secured to the end of a transverse shaft 22 which is rotatably mounted within the horizontal frame and disposed at right angles to the shaft 18. Both of said shafts 13 and 18 extend entirely through the end members of the machine and are operatively interconnected by means of links 23 which are actuated by a handle 24, whose one end is secured to the shaft 18. Thus it will be seen that actuating the handle from one position to another, such for instance, as from the full line position to the dotted line position shown in Figure 3, will cause both of said shafts to rotate, and also cause the transverse shafts 13 and 22 to rotate. Within the upright frame I securely mount a plurality of supplemental frames generally indicated at 25, 26 and 27. Each of said frames consists of a pair of parallel channel members arranged face to face to form tracks for the adjustment or movement of the abutments or clamping members therein.

The horizontal frame is likewise provided with supplemental frame members which are generally indicated at 28, 29 and 30. Inasmuch as these various members are substantially identical with each other in construction, a description of one will suffice for all. As best illustrated in Figures 4 to 6 inclusive, the movable clamping members consist of a platform 31 which constitutes one of the work rests and whose upper surface lies flush with the top surface of the channel members so that a smooth surface is presented across the tops of the channels and the platform. The end walls of the platform extend downwardly as at 32 and outwardly as at 33. The portions 33 acting as a sliding support for the platform, are adapted to move from end to end in the direction of the length of the channel members. Extending entirely through the downwardly turned walls 32 is a threaded shaft 34 which is rotatably mounted therein and held in place at one of its ends by a nut 35, and at its opposite end by any approved form of actuating collar or handle 36. Threadedly mounted upon the shaft 34 is an internally threaded collar 37 which is secured to the underside of the platform 31, and is also pivotally connected as at 39 with a pair of parallel links 40. These links extend from the collar 37 toward the actuating shafts and are operatively connected therewith by means of arms 41 carried by collars 41a which are secured to the shafts by any approved means, such as set screws, or the like, not shown. The shafts shown in Figures 4 and 5 may represent any one of the shafts 13, 17, 18 and 22. The links are pivotally connected as at 42 to the lower ends of the arms 41 so that rotation of the actuating shaft will cause the platform to move in either direction toward or away from the work being dealt with and which work rests upon the tops of the channel members which form the supporting tracks. The relation of the platform to the actuating shaft may be adjusted by means of the threaded shaft 34 which when rotated in either direction will advance or retard the platform with respect to its support. Upon the upper surface of the platform I provide any suitable form of clamping member which may be in the form of an angle bar as indicated at 43. This abutment is movable with the platform and engages under pressure with the work being dealt with as the actuating shaft is rotated. Within the frame 25, I provide a stationary abutment 43A which is identical with the movable clamping members except that it is not connected with an actuating shaft for longitudinal movement in the frame but instead is adjustable lengthwise of the frame to form a limit stop for the work. The platforms which are slidably mounted within the frames 26 and 27 are operatively connected with the shafts 13 and 17 by means of the links 40, arms 41 and collars 41a, as aforesaid.

In addition to the abutments and clamping members above described I also provide a fixed abutment 44 arranged transversely of the horizontal frame and secured thereto by any approved means. This abutment may be in the form of an angle bar having spaced adjustable abutments 45 threadedly mounted thereon. Along the rear edge of the horizontal frame I also provide fixed abutments 46 likewise provided with adjustable abutments 47. Within the frame 25, I provide an adjustable abutment 47a mounted to a support 47b which is carried by the transverse members 47c of the frame 25.

At the right-hand side of the horizontal frame I provide another supplemental frame indicated at 48 within which one of the platforms is slidably mounted and operatively connected to the shaft 22. This platform is provided with a clamping element 49 having adjustable abutments 50 threadedly mounted thereon.

On the platforms which are slidably mounted within the frames 28 and 30 in the horizontal frame I provide upstanding clamping members 51 provided with adjustable abutments 52, which are adapted to bear against the outer ends of the arms of the davenport frame, as best shown in Figure 3.

For accommodating work of various heights the entire frame 27, in the vertical frame, is slidable vertically in the channel members at both of its ends. For convenience in adjusting the frame 27 to various heights I provide a screw shaft 27a which is secured as at 27b to one side of the frame 27. The opposite end of the screw shaft extends through the transverse member 8 and is provided with a nut 27c, which, when rotated will raise or lower the frame 27. When an adjustment is to be made the set screw in the collar 41a is first loosened so that the links 40 and their connection to the shaft 17 are free to move along the shaft.

The various structural elements of davenports which are to be united in the assembling of the completed frame, are first provided with drilled holes in certain of the members and dowel pins in the companion members; the dowels being adapted to firmly engage within the drilled holes, all in accordance with the usual practice in the construction of furniture. In preparing furniture frame work for use with my invention, these various structural elements are first joined together loosely, i. e., they are joined together with sufficient hand pressure so that the entire unit may be lifted from the assembly bench and placed upon the horizontal frame and work rests of my machine with certain structural elements bearing against the fixed abutments on the machine. Following this, the operator of the machine presses downwardly upon the handle 24 to simultaneously actuate all of the shafts 13, 17, 18 and 22, which will move all of the clamping members against the various structural elements of the davenport in opposing directions, so that all of the elements will be forced together to their absolute limit of abutment. Rotation of shaft 18 will draw the clamping elements 51 and 43 against the front of the davenport structure, and rotation of shaft 22 will push the abutments 50 against the end of the davenport. Rotation of the shaft 13 draws clamping element 43, in the vertical frame, against the transverse member 12b of the davenport structure and rotation of shaft 17 draws the clamping element in frame 27 against the end of the davenport structure. With the actuating handle thus in its down position it will remain locked in this position by reason of the relation of the links 23 to the shafts 13 and 18 and to the handle. The turning of the shafts moves the work rests and abutments, the final adjustments of the abutments against the work being made by rotating the screws.

Although I have shown hand actuating means for rotating the actuating shafts it is to be understood that automatic means may be used which may be either in the form of an air actuated lever, or an electrically actuated lever, or I may choose to connect the actuating handle with a foot pedal within convenient reach of the operator.

While I have shown a particular form of embodiment of my invention, I am aware that many minor changes therein will readily suggest themselves to others skilled in the art without departing from the spirit and scope of the invention.

What I claim as new and desire to protect by Letters Patent is:—

1. A davenport clamp comprising, two frame sections, one of said sections lying in a horizontal plane and the other upright, spaced, independently adjustable work rests provided on each of said frame sections, a work clamping member secured to each work rest, adjustable abutments opposing said work rests, and operating means connected with said work rests for simultaneously advancing them toward their respective abutments.

2. A davenport clamp comprising two frame sections secured together at one side, one of said sections lying in a horizontal plane and the other in a vertical plane, both of said sections being joined together along the rear edge of the horizontal frame, spaced, independently adjustable work rests provided on each of said frame sections, a work clamping member secured to each work rest, adjustable abutments opposing said work rests, and a single operating means connected with all said work clamping members and adapted to operate the same simultaneously.

3. A davenport clamp comprising two frame sections secured together at one side, one of said sections lying in a horizontal plane and the other in a vertical plane, both of said sections being joined together along the rear edge of the horizontal frame, spaced, independently adjustable work rests provided on each of said frame sections, a work clamping member secured to each work rest, adjustable abutments opposing said work rests, operating means connected with all of said work clamping members and adapted to operate the same simultaneously, and means for temporarily locking said operating means in position when the work clamping members have been moved into active position.

4. A davenport clamp comprising, two frame sections, one of said sections lying in a horizontal plane and the other in a vertical plane, both of said sections being joined together along the rear edge of the horizontal frame, spaced independently adjustable work rests provided on the opposite ends and one side of said horizontal frame section, said work rests being provided with work clamping members and adapted to engage opposite ends and one side of the work, an adjustable abutment provided at one end of said upright frame section, a work rest comprising a work clamping member provided on the opposite end of said upright frame, said abutment and work clamping member adapted to engage both ends of the upper portion of the work, an intermediate and adjustable work clamping member provided on said upright frame section for engaging the top edge of the work, means for adjusting said clamping members relatively to the work, operating means connected with all of said work-clamping members and adapted to operate the same simultaneously.

5. A davenport clamp comprising two frame sections, one of said sections lying in a horizontal plane and the other in a vertical plane, both of said sections being joined together along the rear edge of the horizontal frame, spaced, independently adjustable work rests provided on the opposite ends and one side of said horizontal frame section, said work rests adapted to engage opposite ends and one side of the work, certain of said work clamping members provided with upstanding abutments, said upright frame section provided with a work rest at one end and an abutment at the opposite end, said last mentioned work rest being adjustable relatively to the work, an adjustable work clamping member provided on the said upright frame section for engaging the top edge of the work, operating means connected with all of said work clamping members and adapted to operate the same simultaneously, and means for temporarily locking said operating means in position when the work clamping members have been moved into active position.

6. A davenport clamp comprising, two frame sections, one of said sections lying in a horizontal plane and the other in a vertical plane, both of said sections being joined together along the rear edge of the horizontal frame, work rests provided on the opposite ends and one side of said horizontal frame section, said work rests adapted to engage opposite ends and one side of the work, and one of said work rests comprising a work clamping member operable to effect a clamping action on the work, an adjustable abutment provided at one end of said upright frame section, and a work clamping member provided on the opposite end of said upright frame, an intermediate and adjustable work clamping member provided on said upright frame section for engaging the top edge of the work, means for adjusting all of said clamping members relatively to the work, operating means connected with all of said work clamping members and adapted to operate the same simultaneously, and means for temporarily locking said operating means in position when the work clamping members have been moved into active position.

7. A davenport clamp comprising, two frame sections, one of said sections lying in a horizontal plane and the other in a vertical plane, both of said sections being joined together along the rear edge of the horizontal frame, spaced apart and adjustable work rests provided on the opposite ends and one side of said horizontal frame section, said work rests adapted to engage opposite ends and one side of the work, and one of said work rests comprising a work clamping member operable to effect a clamping action on the work, certain of said work clamping members provided with upstanding abutments, said upright frame section provided with a work rest, said last mentioned work rest being adjustable relatively to the work, an adjustable abutment provided at one end of said upright frame, an adjustable work clamping member provided on said upright frame section for engaging the top edge of the work, operating means connected with all of said work clamping members and adapted to operate the same simultaneously, and means for temporarily locking said operating means in position when the work clamping members have been moved into active position.

8. In a davenport clamp comprising, two frame sections, one of said sections lying in a horizontal plane and the other in a vertical plane, both of said sections being joined together along the rear edge of the horizontal frame, work rests provided on each of said frame sections, a work clamping member secured to each work rest, said work rests slidably mounted upon guide elements carried by the frame sections, respectively, longitudinally and transversely arranged rotatable shafts journaled in said frame sections, respectively, gears connecting said longitudinal and transverse shafts, respectively, operating arms carried by said shafts, links adjustably interconnecting said arms and said work rests respectively, and means for rotating said shafts simultaneously and thereby forcing said clamping elements simultaneously upon the work.

9. In a davenport clamp, two frame sections, one of said sections lying in a horizontal plane and the other in a vertical plane, both of said sections being joined together along the rear edge of the horizontal frame, spaced, independently adjustable work rests provided on each of said frame sections, a work clamping member secured to each work rest, means for adjusting said work rests and said work clamping elements relatively to the work, said work rests slidably mounted upon guide elements carried by the frame sections, respectively, adjusting screws threaded in said clamping members, longitudinally and transversely arranged rotatable shafts journaled in said frame sections, respectively, gears connecting said longitudinal and transverse shafts, respectively, operating arms carried by said shafts, links connecting said arms and said adjusting screws, respectively, and means for rotating said shafts simultaneously and thereby forcing said clamping elements simultaneously upon the work.

HARRY A. GREEN.